United States Patent [19]

Downey, Jr.

[11] Patent Number: 4,818,624

[45] Date of Patent: Apr. 4, 1989

[54] STABILIZED LIGHT-POLARIZING MATERIAL

[75] Inventor: John F. Downey, Jr., Lexington, Mass.

[73] Assignee: Polaroid Corporation, Patent Department, Cambridge, Mass.

[21] Appl. No.: 945,301

[22] Filed: Dec. 19, 1986

[51] Int. Cl.$^4$ .............................. B32B 9/04; B05B 5/06
[52] U.S. Cl. ................................ 428/447; 428/451; 428/483; 428/58; 428/910; 428/518; 428/423.7; 427/163; 350/337
[58] Field of Search ............... 428/447, 451, 483, 910, 428/518; 427/163

[56] References Cited

U.S. PATENT DOCUMENTS

| Re. 23,297 | 11/1950 | Hyman et al. | 350/160 |
| 2,173,304 | 9/1939 | Land et al. | 88/65 |
| 2,445,555 | 7/1948 | Binda | 88/65 |
| 3,941,901 | 3/1976 | Harsch | 427/163 X |
| 4,150,877 | 4/1979 | Kobale et al. | 350/341 |
| 4,151,326 | 4/1979 | Funada et al. | 252/299.4 |
| 4,166,871 | 9/1979 | Schuler | 427/163 |
| 4,235,526 | 11/1980 | Berman et al. | 350/344 |
| 4,381,886 | 5/1983 | Yokohura et al. | 350/341 |
| 4,387,133 | 6/1983 | Ichikawa | 428/215 |
| 4,396,646 | 8/1983 | Schuler | 427/163 |
| 4,472,027 | 9/1984 | Okubo et al. | 350/340 |
| 4,544,724 | 10/1985 | Sogah et al. | 526/279 |
| 4,564,266 | 1/1986 | Durand et al. | 350/340 |
| 4,591,512 | 5/1986 | Racich et al. | 427/163 |
| 4,603,057 | 7/1986 | Ueno et al. | 427/132 |
| 4,617,239 | 10/1986 | Maruyama et al. | 428/452 |
| 4,659,523 | 4/1987 | Rogers et al. | 427/163 X |
| 4,674,840 | 6/1987 | Bennett | 350/337 |

FOREIGN PATENT DOCUMENTS

| 0252517 | 12/1985 | Japan | 252/299.5 |
| 0252518 | 12/1985 | Japan | 252/299.5 |

OTHER PUBLICATIONS

F. J. Kahn, in "Orientation of Liquid Crystals by Surface Coupling Agents", Appl. Phys. Lett., vol. 22, No. 8, Apr. 15, 1973.
B. Arkles, Petrarch Systems, Inc., "Silane Coupling Agent Chemistry", pp. 71-76 (1984).

Primary Examiner—P. C. Ives
Attorney, Agent, or Firm—Louis G. Xiarhos

[57] ABSTRACT

Light polarizers stabilized against effects of temperature and humidity are provided by a silylation method whereby a polyvinyl alcohol light-polarizing sheet is treated with an organosilane and is heated to bond the organosilane to the polyvinyl alcohol surface and to thereby silylate the surface thereof.

13 Claims, No Drawings

STABILIZED LIGHT-POLARIZING MATERIAL

BACKGROUND OF THE INVENTION

This invention relates to light-polarizing materials and to a method for producing such materials. More particularly, it relates to polyvinyl alcohol light-polarizing materials stabilized against adverse influences of heat and moisture and to a method by which resistance to such influences can be achieved.

Light polarizers, in general, owe their properties of selectively passing radiation vibration along a given electromagnetic vector (and absorbing radiation vibrating along a second given electromagnetic radiation vector) to the anisotropic nature of the transmitting medium. Dichroic polarizers are linear polarizers of the absorptive type and owe their light-polarizing properties to the vectorial anisotropy of their absorption of incident lightwaves. Light entering a dichroic medium encounters two different absorption coefficients, one low and one high. The emerging light vibrates predominantly in the direction of low absorption.

The development of synthetic polarizers has made possible the widespread utility of light-polarizing elements for a variety of applications; and methods for the production of such synthetic polarizers have been known. Among the most widely used synthetic polarizers are the linear dichroic light-polarizing materials of the polyvinyl alcohol type which, in general, comprise a sheet of stretched (oriented) polyvinyl alcohol having light-polarizing (dichroic) molecules, such as polyvinylene molecules formed by heating the oriented polyvinyl alcohol sheet in the presence of a suitable dehydration catalyst such as an atomsphere of hydrogen chloride, or which may be introduced by dyeing the sheet with a dichroic stain such as iodine. By orienting the polyvinyl alcohol matrix unidirectionally, the transition moments of the absorbers are also so oriented and the material becomes visible dichroic.

Methods for the production of light polarizers of the polyvinyl alcohol type are described, for example, in U.S. Pat. No. 2,173,304 (issued Sept. 19, 1939 to E. H. Land et al.); U.S. Pat. No. 2,445,555 (issued July 20, 1948 to F. J. Binda); U.S. Pat. No. Re. 23,297 (reissued Nov. 28, 1950); U.S. Pat. No. 4,166,871 (issued Sept. 4, 1979 to N. W. Schuler); and in U.S. Pat. No. 4,591,512 (issued May 27, 1986 to J. L. Racich et al.). In the manufacture of light polarizer materials, it is known to treat the polarizer material with agents which promote stability of the light polarizing material against, for example, heat, moisture or ultraviolet radiation. Thus, the boration of a polyvinyl alcohol polarizer with an agent such as boric acid is described, for example, in the aforementioned U.S. Pat. Nos. 2,445,555, Re. 23,297; 4,166,871; and 4,591,512. There is a continuing effort, however, in light of increasing demands placed on polarizer elements and the need for such elements to meet the needs of particular applications, directed toward the development of other methods or treatments for the improvement of properties of light-polarizing materials. There is a particular interest in such methods or treatments which can provide stability against various environmental influences and which can be accomplished simply and efficiently.

SUMMARY OF THE INVENTION

It has been found that a uniaxially stretched polyvinyl alcohol dichroic light polarizer can be stabilized against adverse influences of heat and moisture (humidity) by silylating the surface of such a polarizer by treatment with an organosilane. Accordingly, in its product aspect, the present invention provides a polyvinyl alcohol light-polarizing sheet comprising a molecularly oriented linear polyvinyl alcohol sheet having dichroic light-polarizing molecules therein and having at least one surface thereof silylated for stabilization of the light-polarizing sheet against adverse influences of heat and moisture.

In its method aspect, the present invention provides a method for stabilizing a polyvinyl alcohol light-polarizing sheet against adverse influences of heat and moisture which comprises: contacting at least one surface of a molecularly oriented linear polyvinyl alcohol light-polarizing sheet with an organosilane and heating the resulting sheet sufficiently to bond the organosilane to the polyvinyl alcohol sheet and to thereby silylate the surface of said light-polarizing sheet.

DETAILED DESCRIPTION OF THE INVENTION

The benefit of the silylation treatment hereof can be applied, in general to light-polarizing sheet materials of the polyvinyl alcohol type containing dichroic light-polarizing molecules. In general, light-polarizing materials of this type will be prepared from a molecularly oriented (stretched) sheet of linear polyvinyl alcohol.

The polyvinyl alcohol (PVA) sheet material used in the production of light-polarizing elements can be prepared by unidirectionally stretching a sheet of PVA having a thickness of from about 0.038 to about 0.051 mm. to between about 2.5 to 4 times its normal dimensions. This stretching can be performed using methods known in the art. After the PVA sheet has been stretched and the molecules thereof have become oriented, the sheet assumes a somewhat fibrous nature and its tensile strength in the direction transverse to the stretch direction is significantly diminished. Accordingly, it will be a preferred practice to bond or laminate the stretched sheet to a supporting material prior to introduction of the dichroic light-polarizing molecules into the PVA sheet.

Any of a variety of support sheets can be used for this purpose, depending upon the particular application intended for the finished polarizer. Suitable support materials include glass and known polymeric sheet materials such as the cellulose esters (e.g., nitrocellulose, cellulose acetate, cellulose acetate butyrate), polyesters, polycarbonates, vinyl polymers such as the acrylics, and other support materials that can be provided in a sheet-like, light-transmissive form. Polyesters are especially useful, depending on the particular application and the requirements thereof. A preferred polyester is polyethylene terephthalate, available under the Mylar and Estar tradenames, although other polyethylene terephthalate materials can be employed. The thickness of the support material will vary with the particular application. In general, from the standpoint of manufacturing considerations, suppports having a thickness of about 0.5 mil (0.013 mm.) to about 20 mils (0.51 mm.) can be conveniently employed.

If desired, the light-polarizing molecules can be introduced into the PVA sheet material without prior lamination to a support sheet. In many instances, however, it will be preferred to first laminate a stretched PVA sheet to a support sheet and to, then, introduce the light-polarizing (dichroic) molecules. Any of a variety of adhesives can be used for the lamination including polyvinyl alcohol adhesives and polyurethane adhesive materials. Inasmuch as the finished polarizer will normally be employed in optical applications, an adhesive material which does not have an unacceptable affect on the light transmission properties of the polarizer will generally be employed. The thickness of the adhesive material will vary with the particular application. In general, thicknesses of about 0.25 mil (0.006 mm.) to about 1.0 mil (0.025 mm.) are satisfactory.

Light-polarizing molecules can be introduced into the PVA sheet material by resort to methods generally known and described in the aforementioned United Stated patents. One preferred type of light polarizer comprises a PVA sheet containing dichroic molecules introduced by staining the sheet with a dichroic dye such as iodine. Another preferred type contains polyvinylene molecules introduced, for example, by treatment of the oriented sheet with fuming hydrogen chloride and heating (dehydrating) the treated material to introduce the desired polyvinylene molecules.

The silylation method of the present invention can be employed to provide stability in the case of the polyvinyl alcohol polarizers hereinbefore described and can be accomplished simply and efficiently. In general, the treatment will be applied to at least one surface of the PVA light polarizer. When, for example, the oriented PVA sheet is carried on a suitable support sheet, the silylation treatment can be applied to the polarizer side by spraying or otherwise contacting the surface thereof with the silylation material. A preferred method involves the transporting of a support/polarizer lamination over a bath of silylation material in a manner such that the polarizer side is brought into contact with the surface of the treating bath. The amount of silylation material contacting the support side of the lamination is minimized and the cleaning or removal or silylation material therefrom is facilitated. If the polarizer material is not carried by a support sheet, the PVA sheet can be conveniently immersed into a bath of silylation material, in which case, silylation of both surfaces of the light polarizer can be effected. In general, good results can be obtained by silylating a light-polarizing material which comprises the light-polarizing polyvinyl alcohol sheet carried on a suitable support material, using the preferred method hereinbefore described.

In accordance with the present invention, a polyvinyl alcohol polarizer is treated with an organosilane compound to enhance the stability of the polarizer to high humidity and heat. The treatment reduces substantially the hydroxyl content of the polyvinyl alcohol polarizer by organosilylation occurring at hydroxyl sites on the surface of the polyvinyl alcohol. As a consequence, reduced fading, less color shifting and reduced shrinkage are observed when the treated polarizers are subjected to elevated temperatures or humidity, when compared to corresponding polarizers which have not been treated in the manner of the invention.

To achieve the foregoing benefits, a polyvinyl alcohol polarizer is treated with an organosilane compound capable of reaction with hydroxyl sites on the surface of the polarizer. If desired, an organosilane having groups directly reactable with such hydroxyl groups can be employed. An example of such an organosilane is a trichloroorganosilane, which can, for example, be reacted directly in the presence of an aprotic solvent such as dimethylformamide. In most instances, the organosilylation treatment will be performed using an organosilane which has been first allowed to undergo hydrolysis for conversion of hydrolyzable groups and formation of silanol groups reactive with the polarizer at hydroxyl sites on the surface of the polarizer. Following hydrolysis, the silane solution is applied to the polyvinyl alcohol polarizer at a preselected rate by an appropriate coating, spraying dipping or like method. A suitable coating device is a slot-heat coater. Other suitable coating devices can be used. In any event, the silane solution is applied at a rate which delivers a predetermined amount per unit area which can vary with the particular nature of the light-polarizing material and the hydroxyl content thereof.

Subsequent to the application step, the treated polarizing layer is heated until dry, under preselected heating conditions. The drying can be done in a conventional drying oven or by application of heated air. In general, the heating step will be performed at a temperature in the range of from about 120° F. to about 210° F., and preferably at from 190° F. to 200° F.

Methods for the preparation of silylated surfaces (and organosilanes suited to silylation treatments) are known in the art and are described in the review article "Silane Coupling Agent Chemistry" by B. Arkles, Petrach Systems, Inc. (1984).

Organosilane compounds useful in providing the silylated polyvinyl alcohol polarizers hereof, in general, comprise a tetravalent silicon atom having at least one non-hydrolyzable group bonded to the silicon atom by a silicon-to-carbon covalent bond and up to three hydrolyzable groups covalently bonded to the silicon atom. Useful compounds can be represented by the formula

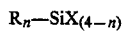

wherein R is a non-hydrolyzable organic radical; n is an integer of from one to three; and X is a hydrolyzable group. Typically, n will be the integer one and the non-hydrolyzable group will comprise an organic group such as alkyl, aryl, alkaryl, aralkyl or the like, optionally substituted with a halogen, amino, alkylamino or other substituent group. Suitable hydrolyzable X groups include alkoxy (e.g., methoxy), acyloxy (e.g., acetyloxy), amino or halo (e.g., chloro). When each X is halo, the organosilane can be reacted directly with hydroxyl groups of the polarizer and hydrolysis for production of silanol groups can be avoided, if desired. Preferred non-hydrolyzable groups are the 3-N-methylaminopropyl and N-2-aminoethyl-3-aminopropyl groups represented in the organosilanes of the formula

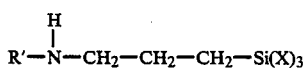

wherein X is a hydrolyzable group such as methoxy and R' is alkyl (e.g., methyl, ethyl) or aminoalkyl (e.g., 2-aminoethyl).

Any of a variety of organosilanes as herein described can be used to provide the polyvinyl alcohol polarizer with a silylated surface. The particular silane used for the silylation treatment should not, however, when combined with the polarizer, adversely affect the transmission of the polarizer.

As noted earlier, the organosilane compound will normally be hydrolyzed prior to the coupling reaction whereby the organosilane is convalently bonded to the polarizer surface. Water for hydrolysis can be added to the surface of the polarizer to effect hydrolysis of the organosilane applied thereto. In general, however, it will be convenient to prepare an aqueous solution of the organosilane and to permit the hydrolysis to occur prior to application of the hydrolyzed solution to the surface of the polarizer. The hydrolyzed organosilane couples to the polyvinyl alcohol polarizer surface when heat is applied.

The silylation of a substrate, as described in the hereinbefore cited review article of B. Arkles, typically involves four steps. The first is hydrolysis of the three labile X groups attached to silicon. Condensation to oligomers follows. The oligmers then hydrogen bond with the OH groups of the substrate. Finally, during drying or curing, a covalent linkage is formed with the substrate. Concommitant with this linkage, there is a corresponding loss of water. At the interface there is usually only one bond from each silicon of the organosilane to the substrate. The remaining silanol groups are present either bonded to other silicon atoms or in free form.

Silylation of a polyvinyl alcohol (PVA) polarizer and attachment of the hydrolyzed organosilane to the polymeric backbone of the PVA substrate are represented by the following scheme.

should not substantially diminish the trasmission of the polarizer layer.

In the production of silylated light-polarizing elements by the method of the invention, additional treatments can be employed for improved polarizer properties. For example dye receptivity of the PVA sheet for dichroic dye can be improved by incorporating mordanting compounds into the PVA material as described in U.S. Pat. No. 4,396,646 (issued Aug. 2, 1983 to N. W. Schuler et al.). The boration of a light polarizer provides known stabilization benefits as mentioned previously. The use of a zinc treatment can also be employed for improved efficiencies as described in U.S. Pat. No. 4,166,871 (issued Sept. 4, 1979 to N. W. Schuler) and in U.S. Pat. No. 4,591,512 (issued May 27, 1986 to J. L. Racich, et al.). Depending upon the particular application intended for a finished polarizer and the particular requirements thereof, it may be desirable to employ one or more of these auxiliary treatments in the production of a silylated light polarizer of the invention.

The following are examples of silylation treatments of a polyvinyl alcohol polarizer leading to the noted benefits. The polyvinyl alcohol polarizer treated in Examples 1 to 3 hereof comprised a layer of polyvinyl alcohol which was stretched and laminated to a polyethylene terephthalate support sheet of 7 mil (0.18 mm.) thickness, treated (protonated) with fuming hydrochloric acid, heated (dehydrated) to introduce dichroic polyvinylene molecules, and borated for stability using boric acid, in accordance with conventional methodology.

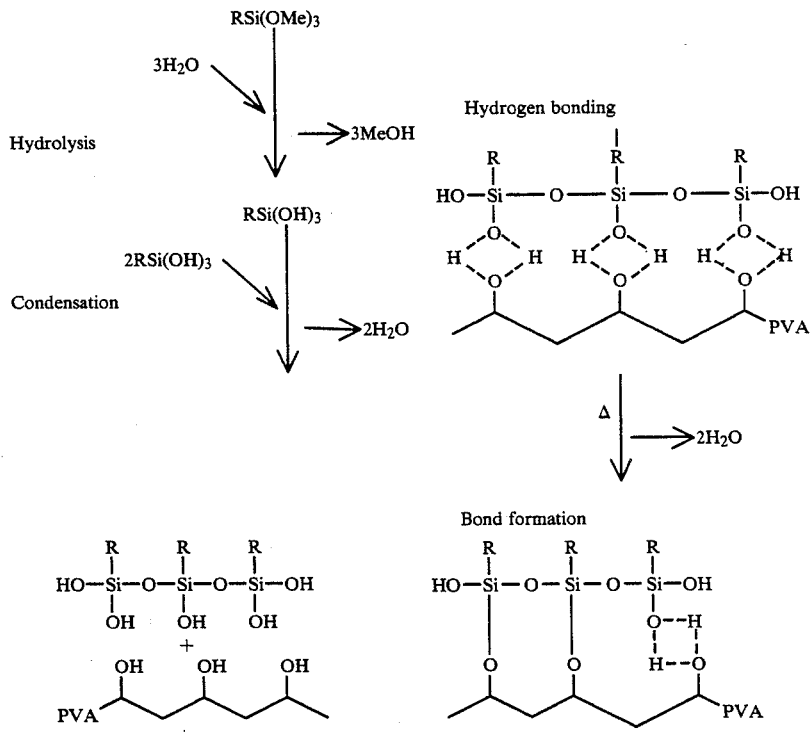

In calculating the amount of silane necessary to treat a surface, the number of reactive sites on a surface area and the type of silane deposition sought (e.g. monolayer, multilayer or bulk) are factors which along with other factors known in this field can be considered. Whatever silane compound is used, however, it should remove substantially the hydroxyl content of the treated surface of the polyvinyl alcohol substrate and

EXAMPLE 1

To 1470 gms. deionized water were added 30 gms. of N-2-aminoethyl-3-amino propyl trimethoxy silane and 0.15 gm. of a nonionic fluorinated surfactant (FC 170-C manufactured by the 3M Corporation). After one-half hour standing to allow the silane to hydrolyze, this solution was coated at a flow that would deliver 14 mgs. per square foot (151 mgs/m.²) of the silane onto the polyvinyl alcohol polarizer surface supported on the polyester sheet. The coating was drived at 200° F. for approximately three minutes.

EXAMPLE 2

A polarizer layer supported on a polyester sheet, as described, was coated and dried as described in EXAMPLE 1, but using 1470 gms. of a 95% isopropanol —5% water solution based on weight.

EXAMPLE 3

A polarizer layer supported on a polyester sheet, as described, was coated with a hydrolyzed solution of organosilane and heated as described in Example 1, using a solution of 30 gms. of 3-N-methylamino propyl trimethoxy silane rather than N-2-amino ethyl-3-amino propyl trimethoxy silane.

Visual examination of the silated light polarizers prepared by the silylation treatments of EXAMPLES 1 to 3 showed the optical properties thereof to be unaffected by the silylation treatments, as determined by visual comparison with the corresponding non-silylated light polarizers.

EXAMPLE 4

There was utilized for the silylation treatments of this example a polyvinyl alcohol polarizer comprising a layer of polyvinyl alcohol which was stretched and laminated to a polyethylene terephthalate support sheet of 7 mil (0.18 mm.) thickness, treated (protonated) with fuming hydrochloric acid and heated (dehydrated) to introduce dichroci polyvinylene molecules. The light polarizer used in the silylation treatments of this example was the same as that used for the silylation treatments of EXAMPLES 1 to 3, except that in this instance, no boration step was included in the manufacture thereof. The unborated light polarizer, exhibiting a pinkish hue, was silylated in the following manner.

As aqueous silylation solution was prepared at a 1% by weight concentration of N-2-aminoethyl-3-aminopropyl trimethoxy silane and 0.1% of nonionic fluorinated surfactant (FC 170-C, available from 3M Corporation). After standing for one-half hour to allow the organosilane to hydrolyze, the resulting silylation solution was coated at rates providing three different coverages based on the N-2-aminoethyl-3-aminopropyl trimethoxy silane as follows: 27 mgs./ft² (291 mgs./m.²); 54 mgs./ft² (581/mgs./m.²); and 81 mgs./ft² (872 mgs./m.²). The coated samples were dried at 200° F. for approximately three minutes. Samples of each of the resulting silylated polarizers (identified, respectively, as P-291, P-581 and P-872, on the basis of their coverage) were subjected to storage conditions for 24 hours as follows. One set (comprising P-291, P-581 and P-872) of silylated polarizers was stored at 120° F. and 90% relative humidity (R.H.). Another set was stored at 120° F. and 95% R.H.; and a third set was stored at 165° F. in a heated oven at ambient relative humidity (about 45% R.H.). For purposes of comparison, a control polarizer (identified as Control P-4) was stored under each of the storage conditions. The Control P-4 polarizer was the same polarizer without a silylation treatment. The samples were visually examined after the respective storage treatments, with the results reported in TABLE I as follows:

TABLE I

| SAMPLE | COVERAGE (mgs./m²) | STORAGE CONDITIONS (24 hours) | OBSERVATIONS |
|---|---|---|---|
| P-291 | 291 | 120° F./90% R.H. | Slight fading |
| P-581 | 581 | 120° F./90% R.H. | Slight fading |
| P-872 | 872 | 120° F./90% R.H. | Slight fading |
| Control P-4 | 0 | 120° F./90% R.H. | Slight fading |
| P-291 | 291 | 120° F./95% R.H. | Slight PVA shrinking; Slight fading |
| P-581 | 581 | 120° F./95% R.H. | Slight PVA shrinking; Slight fading |
| P-872 | 872 | 120° F./95% R.H. | Slight PVA shrinking; Slight fading |
| Control P-4 | 0 | 120° F./95% R.H. | Severe PVA shrinking; Slight fading |
| P-291 | 291 | 165° F./Ambient R.H. | Slight color shift |
| P-581 | 581 | 165° F./Ambient R.H. | Slight color shift |
| P-872 | 872 | 165° F./Ambient R.H. | Slight color shift |
| Control P-4 | 0 | 165° F./Ambient R.H. | Severe color shift/Burnt appearance |

As can be seen from inspection of the results reported in TABLE I, slight fading (of the initial pink coloration) was observed at each coverage (P-291, P-581 and P-872) compared with the control (Control P-4) at 120° F. and 90% relative humidity. An increase in relative humidity to 95% showed severe PVA shrinking in the case of the control (Control P-4) compared to the slight shrinkage at each coverage (P-291, P-581 and P-872). Heating at 165° F. produced a slight color shift (to the brown) at each coverage (P-291, P-581 and P-872) compared with a severe color shift and burnt appearance in case of the control (Control P-4).

The silylated light polarizers of the invention can be employed in any of a number of applications in which light-polarizing materials are employed. The polarizers can be used in the fabrication of sunglass lenses, optical filters and in the production of electro-optic displays. The employment of silylated polarizing materials in the construction of a liquid crystal display is disclosed and claimed in my patent application, entitled "Liquid Crystal Display Having Silylated Light Polarizer", U.S. Ser. No. 944,429, now U.S. Pat. No. 4,759,611 filed of even date.

The following example illustrates the use of a silylated light polarizer of the invention in the manufacture of an electroconductive sheet element.

EXAMPLE 5

An electroconductive sheet assembly (identified as ECSA-5) was prepared by vacuum depositing onto the silylated polarizer surface of the article prepared in EXAMPLE 1, a transparent electrode structure comprising the following layers in sequence: titanium dioxide; silver; gold; and titanium dioxide. For purposes of comparison, a control electroconductive sheet assembly (ECSA-5C) was prepared and was the same as the ECSA-5 assembly, except that, the polarizer layer thereof had not been silylated. Each of the ECSA-5 and ECSA-5C assemblies were evaluated for initial electroconductivity, by resort to conventional resistivity measurement techniques. Each of the assemblies was subjected to environmental storage testing, by storing the assemblies under high heat and humidity conditions, i.e., at 90° F. and 90% R.H. for 42 days. Electroconductivity was determined at the completion of the storage period in each instance. Increase in resistivity (indicating a decrease in conductivity) was less for the ECSA-5 assembly than for the ECSA-5C assembly, indicative of greater storage stability for the electrode material deposited onto the silylated polarizer layer of the ECSA-5 assembly than for the same electrode material deposited onto the non-silylated polarizer layer of the control assembly, ECSA-5C.

What is claimed is:

1. A polyvinyl alcohol light-polarizing article comprising a molecularly oriented polyvinyl alcohol layer having dichroic light-polarizing molecules therein, at least one surface of said polyvinyl alcohol layer being organosilylated.

2. The article of claim 1 wherein said polyvinyl alcohol layer having dichroic light-polarizing molecules therein comprises an iodine-stained light-polarizing layer.

3. The article of claim 1 wherein said polyvinyl alcohol layer having dichroic light-polarizing molecules therein comprises a molecularly oriented polyvinyl alcohol layer having polyvinylene light-polarizing molecules therein.

4. The article of claim 1 wherein said molecularly oriented polyvinyl alcohol layer having dichroic light-polarizing molecules therein comprises a borated light-polarizing layer.

5. The article of claim 1 wherein said light-polarizing layer is supported by a polymeric support sheet.

6. The article of claim 5 wherein said polymeric support sheet comprises polyehtylene terephthalate.

7. The article of claim 1 wherein one surface of said light-polarizing layer is organosilylated.

8. The article of claim 1 wherein said organosilylated surface is provided by contacting at least one surface of said light-polarizing layer with an organosilane and heating the layer sufficiently to bond the organosilane to the surface of said layer.

9. The article of claim 8 wherein said organosilane is obtained by hydrolysis of an organosilane of the formula $$R_n-SiX_{(4-n)}$$

wherein R is a non-hydrolyzable organic radical; n is an integer of from one to three; and X is a hydrolyzable group.

10. The article of claim 9 wherein n is one and each X is alkoxy.

11. The article of claim 10 wherein R is a radical of the formula.

$$R'-\overset{H}{\underset{|}{N}}-CH_2-CH_2-CH_2-$$

wherein R' is alkyl or aminoalkyl.

12. The article of claim 11 wherein said R' is methyl and each X is methoxy.

13. The article of claim 11 wherein said R' is 2-aminoethyl and each X is methoxy.

* * * * *